(No Model.)

C. WAIBEL.
PROCESS OF AND MACHINE FOR MANUFACTURING WADDING FROM CELLULOSE AND COTTON.

No. 483,590. Patented Oct. 4, 1892.

Witnesses:
E. B. Bolton
H. Palmer

Inventor:
Carl Waibel
By _____
his Attorneys.

UNITED STATES PATENT OFFICE.

CARL WAIBEL, OF NEUSTADT-ON-THE-HARDT, BAVARIA, GERMANY.

PROCESS OF AND MACHINE FOR MANUFACTURING WADDING FROM CELLULOSE AND COTTON.

SPECIFICATION forming part of Letters Patent No. 483,590, dated October 4, 1892.

Application filed April 4, 1892. Serial No. 427,748. (No model.)

*To all whom it may concern:*

Be it known that I, CARL WAIBEL, a subject of the King of Bavaria, residing at Neustadt-on-the-Hardt, in the Palatinate of the Rhine, Kingdom of Bavaria, Germany, have invented a new and useful Process of and Machine for Manufacturing Wadding from Cellulose and Cotton, whereof the following is a specification.

My invention consists in a process of and machine for manufacturing wadding composed of purified cellulose and cotton, the said wadding being mainly designed to be employed for dressing wounds, but also serviceable for the production of nitro-cellulose.

The new machinery to be employed in the manufacture of the said wadding consists in an attachment to the carding-machine on which the cotton and the cellulose are to be mixed. The same has the function of spreading out the cellulose on the fleece of cotton; and it comprises a hopper for receiving the cellulose, two feed-regulating rollers, a shaking sieve, and means for imparting to the hopper a trembling or vibrating motion.

Figure 2:
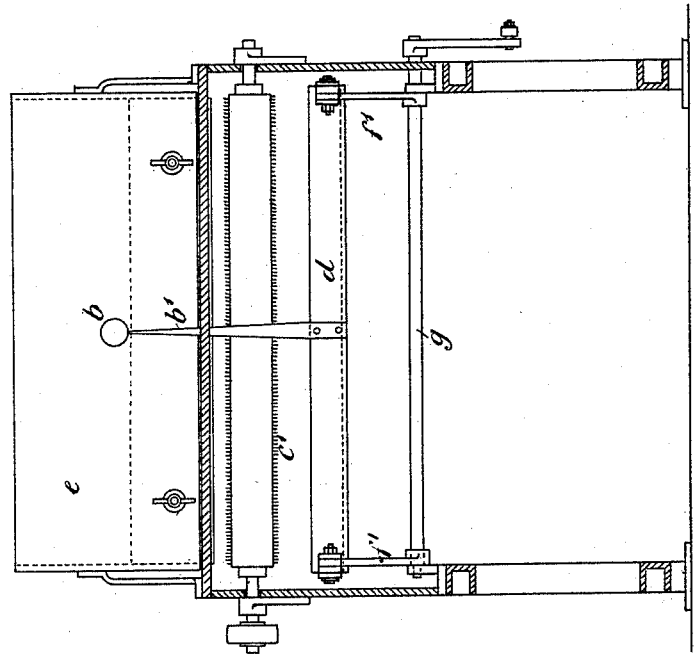
Figure 1:
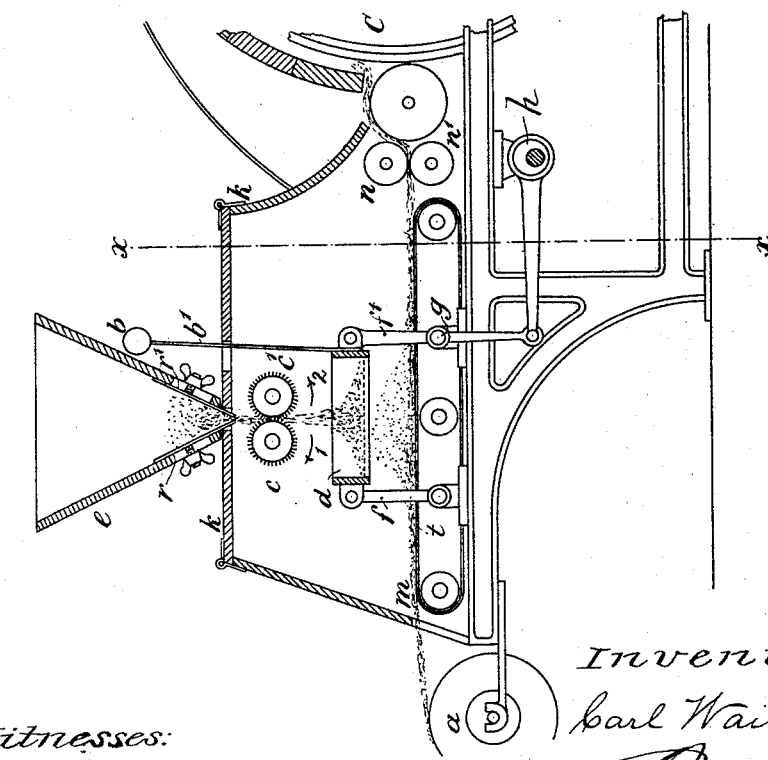

A device of this description is shown in the annexed drawings by Figure 1 in transverse section, together with a portion of the carding-machine to which it is attached, and by Fig. 2 in longitudinal sectional view on line $x\ x$, Fig. 1.

In Fig. 1, C is the main drum of the carding-machine. $n\ n'$ are the feed-rollers thereof, and $t$ is the feed-apron. Above the latter is placed the hopper $e$, having two adjustable slides $r\ r'$ for regulating the width of the bottom slit, through which the cellulose is to drop. Below this slit are arranged the two feed-regulating rollers $c\ c'$, faced with card-clothing, and below these the sieve $d$, mounted on swinging legs $f\ f'$, the legs $f'$ being keyed to a shaft $g$, oscillated by means of a rotating eccentric $h$ and intermediate parts, so that a shaking motion is imparted to the sieve. For vibrating the hopper and causing the cellulose to drop out the sieve $d$ has attached to it an upright rod $b'$, carrying at its free end a knob $b$, preferably of india-rubber, and adapted to strike against the hopper at every reciprocation of the sieve. The rollers $c\ c'$ and the sieve are inclosed, together with the apron $t$, in a box $k$. In front of the receiving end of the traveling apron are arranged bearings for placing therein the roller $a$, carrying the fleece of cotton $m$. After the said fleece has been passed far enough forward on the apron and the machine has been started the cellulose fibers drop from the hopper onto the rollers $c\ c'$, which rotate in the direction of the arrows 1 2 and produce by their carding-pins a renewed loosening of the fibers and a uniform passage of the same between them, though the supply from the hopper may be somewhat irregular. For the purpose of thus loosening the fibers one roller is driven to rotate faster than the other. From the rollers the cellulose drops on the sieve $d$, which distributes it uniformly on the fleece, the said fleece being thereupon drawn into the carding-machine by the rollers $n\ n'$, together with the layer of cellulose fibers.

I claim as my invention—

1. The process of making wadding from cotton and cellulose, which consists in beating the cellulose so as to disaggregate and reduce the fibers thereof, sifting the same for removing the non-disaggregated parts, spreading the disaggregated fibers on a fleece of cotton, and carding the cellulose together with the cotton, substantially as described.

2. In combination, the hopper and means for imparting a trembling motion thereto, the feed-regulating rollers $c\ c'$, arranged below the hopper to receive the material therefrom, the sieve arranged below the feed-rollers, and means for shaking the said sieve, and a traveling feed-apron below the sieve, substantially as described.

3. In combination, the hopper, the sieve arranged below the same, the movable legs $f\ f'$ for the sieve, the traveling apron below the sieve, the means for oscillating the sieve on its supporting-legs, and the upright rod $b'$, having the knob $b$ for vibrating the hopper, substantially as described.

In testimony whereof I have hereunto set my hand in the presence of two subscribing witnesses.

CARL WAIBEL.

Witnesses:
Z. BROKEL,
G. HAFEN